United States Patent [19]

Mashiko et al.

[11] Patent Number: 5,003,542
[45] Date of Patent: Mar. 26, 1991

[54] SEMICONDUCTOR MEMORY DEVICE HAVING ERROR CORRECTING CIRCUIT AND METHOD FOR CORRECTING ERROR

[75] Inventors: Koichiro Mashiko; Kiyohiro Furutani; Kazutami Arimoto, all of Hyogo, Japan

[73] Assignee: Mitsubishi Denki Kabushiki Kaisha, Tokyo, Japan

[21] Appl. No.: 271,491

[22] Filed: Nov. 15, 1988

[30] Foreign Application Priority Data

Jan. 14, 1988 [JP] Japan .................................. 63-7318

[51] Int. Cl.⁵ ...................... G06F 11/10; G11C 29/00
[52] U.S. Cl. .................................. 371/40.1; 371/40.2; 371/51.1
[58] Field of Search ................ 371/40.1, 40.2, 51.1; 365/190, 200, 201

[56] References Cited

U.S. PATENT DOCUMENTS

| | | | |
|---|---|---|---|
| 4,070,648 | 1/1978 | Mergenthaler et al. | 371/70 |
| 4,296,494 | 10/1981 | Ishikawa et al. | 371/13 |
| 4,592,024 | 5/1986 | Sakai et al. | 371/40.1 |
| 4,712,197 | 12/1987 | Sood | 365/190 |
| 4,748,487 | 5/1988 | Uchida et al. | 365/190 |
| 4,748,627 | 5/1988 | Ohsawa | 371/40.2 |

OTHER PUBLICATIONS

Junzo Yamada et al., "A Submicron 1 Mbit Dynamic RAM with a 4-Bit-at-a-Time Built-In ECC Circuit", IEEE Journal of Solid-State Circuits, vol. SC-19, No. 5, Oct. 1984, pp. 627-633.

Junzo Yamada, "Selector-Line Merged Built-In ECC Technique for DRAM's", IEEE Journal of Solid-State Circuits, vol. SC-22, No. 5, Oct., 1987, pp. 868-873.

*Primary Examiner*—Charles E. Atkinson
*Attorney, Agent, or Firm*—Lowe, Price, Leblanc, Becker & Shur

[57] ABSTRACT

In a semiconductor memory device having an error correcting circuit, a pair of bit lines and inverted bit lines are connected to the inputs of first and second inverting amplitude circuits through a first and second N channel MOS transistors, respectively, and the output of the first inverting amplitude circuit is connected to the bit line through a third transistor and the output of the second inverting amplitude circuit is connected to the inverted bit line through a fourth transistor. When an error of information of any bit line pair is detected by an error detecting circuit, the first and second N channel MOS transistors are turned off and each bit line pair is separated from the input of the first and second inverting amplitude circuits and, as a result, information of a bit line pair is rewritten by the output of the first and second inverting amplitude circuits.

8 Claims, 8 Drawing Sheets (a) WORD LINE Wi (b) DUMMY WORD LINE DWk (c) BIT LINE BLj/$\overline{BL}$j (d) SIGNAL SN (e) SIGNAL SP (f) SIGNAL DT (g) SIGNAL RP (h) SIGNAL RN (i) SIGNAL SYj (j) SIGNAL TG (k) SIGNAL EQ

5,003,542

SEMICONDUCTOR MEMORY DEVICE HAVING ERROR CORRECTING CIRCUIT AND METHOD FOR CORRECTING ERROR

BACKGROUND OF THE INVENTION

1. Field of the Invention

The present invention relates to a semiconductor memory device having an error correcting circuit and a method for correcting an error. More particularly, the present invention relates to a semiconductor memory device having an error correcting circuit for detecting and correcting an error in the information read from each memory cell incorporated in a semiconductor memory device and a method for correcting an error.

2. Description of the Prior Art

FIG. 1 is a schematic block diagram showing a conventional MOS dynamic RAM.

Referring to FIG. 1, a description is made of the whole structure of the conventional MOS dynamic RAM. A row address signal is externally applied to a row address buffer 1. The row address buffer 1 stores the row address signal and applies the same to a row decoder 2. The row decode 2 decodes the row address signal to specify a column address of a memory cell array 3. On the other hand, a column address signal is externally applied to a column address buffer 4. The column address buffer 4 stores the column address signal and applies the same to a column decoder 5. The column decoder 5 decodes and applies the column address signal to the memory cell array 3 through a sense amplifier 6 to specify a row address of the memory cell array 3.

A sense signal generating circuit 7 and an I/O circuit 9 are connected to the sense amplifier 6. The sense signal generating circuit 7 outputs a signal for driving the sense amplifier. The input/output of the I/O circuit 9 is switched by an output control circuit 8. More specifically, when the I/O circuit 9 is switched to the input side, the inputted data is stored in a predetermined addressed memory cell in the memory cell array through the sense amplifier 6. When the I/O circuit 9 is switched to the output side, data is read from a predetermined addressed memory cell and outputted from the sense amplifier 6 through the I/O circuit 9. The memory cell array 3 comprises n×m memory cells.

FIG. 2 is a diagram showing in greater detail a memory cell in the MOS dynamic RAM shown in FIG. 1. Referring to FIG. 2, a description is made of a memory cell of the conventional MOS dynamic RAM. Memory cells $MC_{0, 0}$ to $MC_{63, 63}$ constitute a memory cell array with 64 rows and 64 columns, each of cells being a dynamic type of one-transistor one-capacitance type formed of an N channel MOS transistor Q and capacitance $C_S$. Word lines $W_0$ to $W_{63}$ are connected to each of memory cells $MC_{0, 0}$ to $MC_{63, 63}$ and each of word lines $W_0$ to $W_{63}$ is selected by a row decoder 2 in response to a row address signal externally applied. Bit line pairs of the $BL_0$ and $\overline{BL_0}$ to $BL_{63}$ and $\overline{BL_{63}}$ are connected to each of memory cells $MC_{0, 0}$ to $MC_{63, 63}$ in a column direction. Dummy word lines $DW_0$ and $DW_1$ are connected to dummy cells $DM_{0, 0}$ to $DM_{63, 1}$ and any dummy cell is selected by the dummy word lines $DW_0$ and $DW_1$.

Sense amplifiers $SA_0$ to $SA_{63}$ including P channel MOS transistors 61 and 62 and N channel MOS transistors 63 and 64 connected in a crossing manner are connected to the bit line pairs $BL_0$ and $\overline{BL_0}$ to $BL_{63}$ and $\overline{BL_{63}}$. Activation signals SP and SN generated from a sense signal generating circuit 7 are applied to each source of the P channel MOS transistors 61 and 62 and the N channel MOS transistors 63 and 64 comprised in the sense amplifiers $SA_0$ to $SA_{63}$.

The bit line pairs $BL_0$ and $\overline{BL_0}$, and $BL_{63}$ and $\overline{BL_{63}}$ are connected to I/O bus line pair I/O and $\overline{I/O}$ through N channel MOS transistors 10 to 13. Y signal lines $Y_0$ to $Y_{63}$ are applied from the column decoder 5 to the gates of the N channel MOS transistors 10 to 13. Conduction of the N channel MOS transistors 10 to 13 between bit line pairs $BL_0$ and $\overline{BL_0}$ to $BL_{63}$ and $\overline{BL_{63}}$ is controlled by the Y signal lines $Y_0$ to $Y_{63}$. A data output main amplifier 91 and a data input buffer 92 are connected to the I/O bus line pair I/O and $\overline{I/O}$. The data output main amplifier 91 outputs the information from the I/O bus line pair I/O and $\overline{I/O}$ as a data output DO to outside during a reading cycle. The data input buffer 92 converts the level of a data input DI externally applied and applies them to the I/O bus line pair I/O and $\overline{I/O}$ as a complementary signal during a writing cycle.

Next, a description is made of the operation of the memory. During the reading cycle, assuming that, for example, the memory cell $MC_{0, 0}$ is selected, the row decoder 2 raises a potential of the word line $W_0$ and the dummy word line $DW_0$ and an electric charge stored in the storage capacitance $C_S$ is transferred to the bit line pairs $BL_0$ and $\overline{BL_0}$ to $BL_{63}$ and $\overline{BL_{63}}$ which have been previously charged to the same potential. For example, an electric charge representing information of the memory cell $MC_{0, 0}$ is transferred to the bit line $BL_0$ and an electric charge of the dummy cell $DM_{0, 0}$ is transferred to the inverted bit line $\overline{BL_0}$ so as to generate a reference voltage.

When the sense amplifier activation signal SN becomes a low level and the activation signal SP becomes a high level, the sense amplifiers $SA_0$ to $SA_{63}$ are activated. More specifically, a minute difference of a signal voltage caused by an electric charge representing information transferred to the bit line pairs $BL_0$ and $\overline{BL_0}$ to $BL_{63}$ and $\overline{BL_{63}}$ is sensed and amplified. Then, a Y signal line ($Y_0$ in this case) is selected in response to a column address signal which was externally applied to the column decoder 5 and the potential thereof is raised to cause a voltage of a complementary signal on the bit line pair $BL_0$ and $\overline{BL_0}$ to be transferred to the I/O bus line pair I/O and $\overline{I/O}$, respectively, amplified by the data output main amplifier 91 and outputted as the data output DO.

During the writing cycle, data is written to a desired memory cell through a path opposite to the reading cycle. More specifically, the level of the data input signal DI applied from the outside of the chip is converted by the data input buffer 92 and transmitted as a complementary signal to the I/O bus line pair I/O and $\overline{I/O}$. If the $Y_0$ signal line, for example, is selected by the column decoder 5, the complementary data input signal on the I/O bus pair I/O and $\overline{I/O}$ is transferred to the bit line pair $BL_0$ and $\overline{BL_0}$. At this time, if the word line $W_0$, for example, has been selected, the information is written in the memory cell $MC_{0, 0}$ on the intersecting point of the word line $W_0$ and the bit line pair $BL_0$ and $\overline{BL_0}$.

Meanwhile, the conventional MOS dynamic RAM was constituted as described above, the error detecting and correcting circuit was generally connected to the outside. If the error detecting and collecting circuit is contained in the chip, the error detecting and correcting circuit is connected to the output of the data output main amplifier 91 and the input of the data input buffer 92. Then, the data read from the memory cell array 3 is applied to the error detecting and correcting circuit through the I/O bus line pair I/O and I/O and the data output main amplifier 91 to detect and correct the error in the data and the error corrected data is written into the memory cell array 3 through the data input buffer 92 and the I/O bus line pair I/O and I/O. However, when the error is detected and corrected in this way, there is such disadvantage that it takes time to detect and correct the error in data.

In order to reduce time for detecting and correcting the error, the number of data bits useful for detecting the error is to increase at the same time, but if the bit number is increased, the number of the I/O bus line pair I/O and I/O is increased, so that chip area is also increased.

As another example of the MOS type dynamic RAM containing the error correcting circuit, there is "A Submicron 1M bit Dynamic RAM with a 4-Bit-at-a-Time Built-In ECC Circuit" IEEE JOURNAL OF SOLID-STATE CIRCUITS. Vol. SC-19, No. 5 OCTOBER 1984, which is proposed by Yamada, et al. However, this proposed correcting circuit of the dynamic RAM has a relatively complicated structure.

SUMMARY OF THE INVENTION

One object of the invention is to provide a semiconductor memory device having improved error correction.

Another object of the invention is to provide error detection and correction in a semiconductor memory device without requiring use of the I/O lines therefor.

Another object of the invention is to provide, in a semiconductor device, method and circuitry for carrying out error correction having improved error detection and correction rate.

A further object is to provide error correction in a semiconductor device wherein the number of bits undergoing correction may be increased without increasing the number of I/O lines required in the device.

A still further object is to provide improved error correction in a semiconductor memory device without increasing chip area.

Another object is to provide improved error detection and correction method circuitry in a DRAM wherein error detection and correction rate is reduced.

A further object is to provide improved error detection and correction method and circuitry in a DRAM formed of single transistor-single capacitor type memory cells, wherein error detection and correction rate is reduced.

The semiconductor memory device having an error correcting circuit in accordance with a first aspect of the present invention comprises a memory cell array having a plurality of memory cells arranged in the matrix fashion comprising rows and columns and each storing information; a plurality of word lines connecting the memory cells arranged in a row direction; a plurality of bit line pairs connecting the memory cells arranged in a column direction and each constituting a return bit line; error detecting means connected to a plurality of bit line pairs for detecting an error of information of each bit line pair; information inverting means provided corresponding to respective bit line pairs for inverting information of the corresponding bit line pair; first switching means for connecting each bit line pair to each information inverting means; second switching means for outputting information inverted by each information inverting means to the corresponding bit line pair; and control means for controlling the first switching means corresponding to the bit line pair in response to error detection of information of any bit line pair by error detecting means, controlling the corresponding second switching means while cutting the corresponding bit line pair from the information inverting means, and outputting the inverted information on the corresponding bit line pair.

As described above, in a semiconductor memory device in accordance with the present invention, an error correcting circuit can be contained without any increase in the number of I/O bus line pairs and, therefore, any error can be detected and corrected at high speed without increasing in chip area.

In a more preferred embodiment, a plurality of bit line pairs comprise bit lines and inverted bit lines. The bit line is connected to information inverting means by a first switching transistor and the inverted bit line is connected to the information inverting means by a second switching transistor. The information inverting means comprises first and second inverting and amplifying means. The first inverting and amplifying means holds and inverts the information applied from the bit line through the first switching transistor and outputs the same onto the bit line through the second switching means. The second inverting and amplifying means holds and inverts the information inputted from the inverted bit line through the second switching transistor and outputs the same to the inverted bit line through the second switching means.

The second aspect of the invention is a method for correcting the error of data in the semiconductor memory device, by which data stored in a memory cell arranged in matrix fashion consisting of rows and columns is read to the bit line pair and as the read data is inverted, the error of the data is detected and the inverted data is outputted to the bit line pair in response to detection of the error of the data and the inverted data is stored into the respective memory cells so that the error of the data is corrected.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
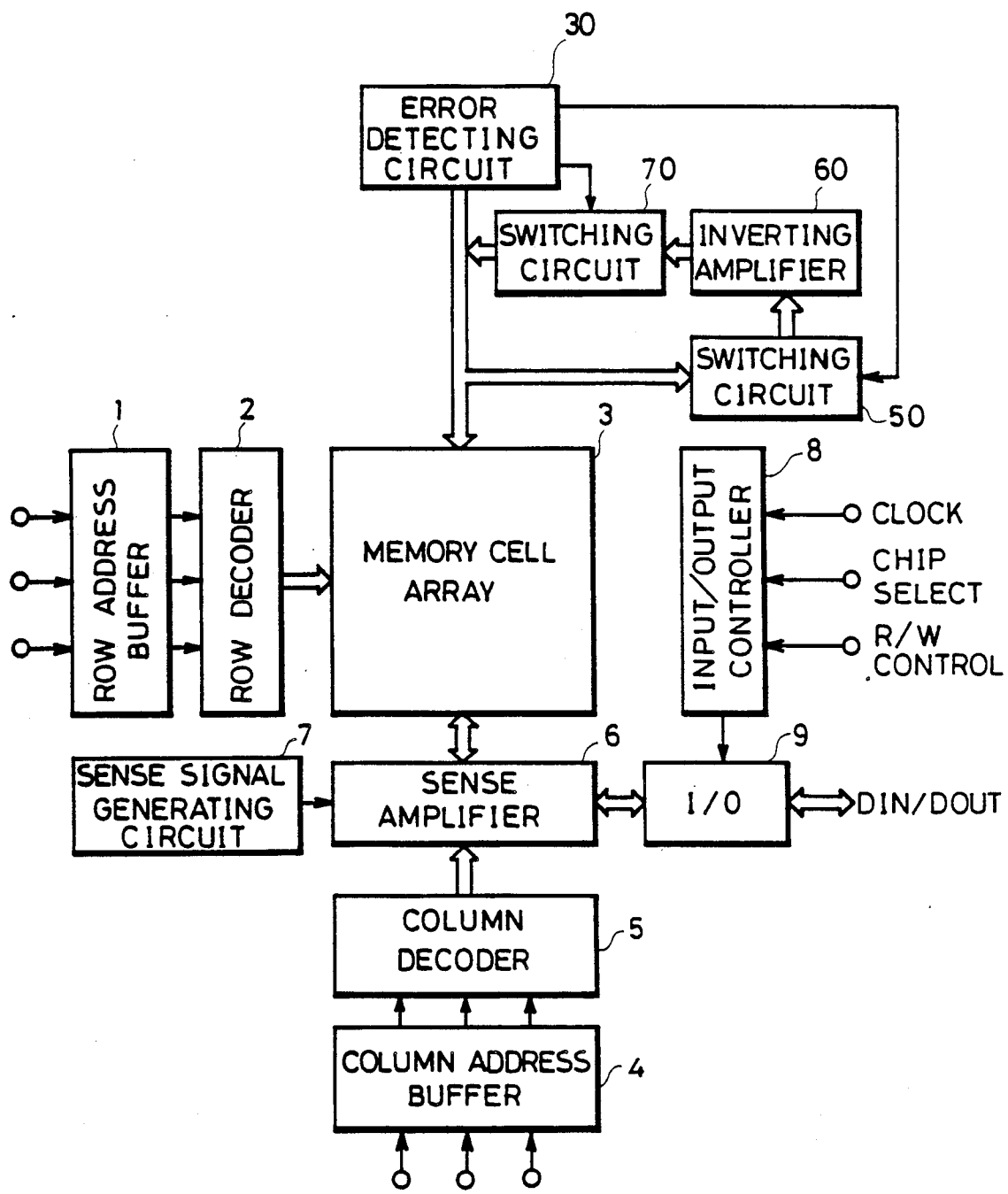
FIG. 3 is a schematic block diagram showing the whole structure of one embodiment of the present invention.

FIG. 3 is a schematic block diagram showing the whole structure of one embodiment of the present invention.

Figure 1:
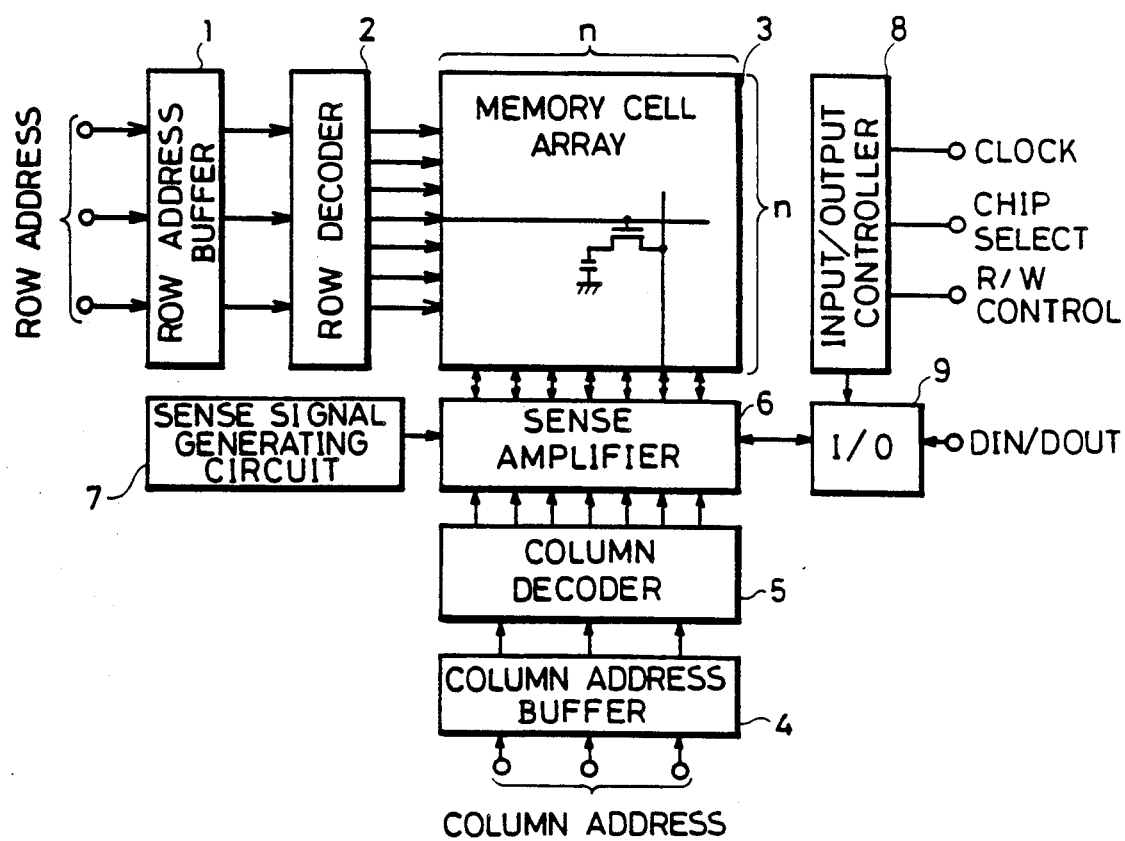
FIG. 1 is a schematic block diagram showing the whole structure of a conventional MOS dynamic RAM.

In this embodiment of the present invention, in addition to the conventional MOS dynamic RAM shown in FIG. 1, an error detecting circuit 30, a first switching circuit 50, an inversion amplifier 60, and a second switching circuit 70 are provided. The error detecting circuit 30 detects an error in the data read from the memory cell array 3. The first switching circuit 50 applies the data read from the memory cell array 3 to the inversion amplifier 60. The inversion amplifier 60 inverts the data read from the memory cell array 3 and the second switching circuit 70 outputs the data inverted by the inversion amplifier 60 to the memory cell array 3.

Next, the operation will be described. The first switching circuit 50 applies the data read from the memory cell array 3 to the inversion amplifier 60 and inverts the same therein. At this time, the second switching circuit 70 is non-conductive, so that the data inverted at the inversion amplifier 60 is not applied to the memory cell array. However, when the error detecting circuit 30 detects the error of the data, the error detecting circuit 30 renders the first switching circuit 50 non-conductive and it renders the second switching circuit 70 conductive. Therefore, the data inverted at the inversion amplifier 60 is applied to the memory cell, array through the second switching circuit 70 and thus, the error of the data is corrected.

Figure 4:
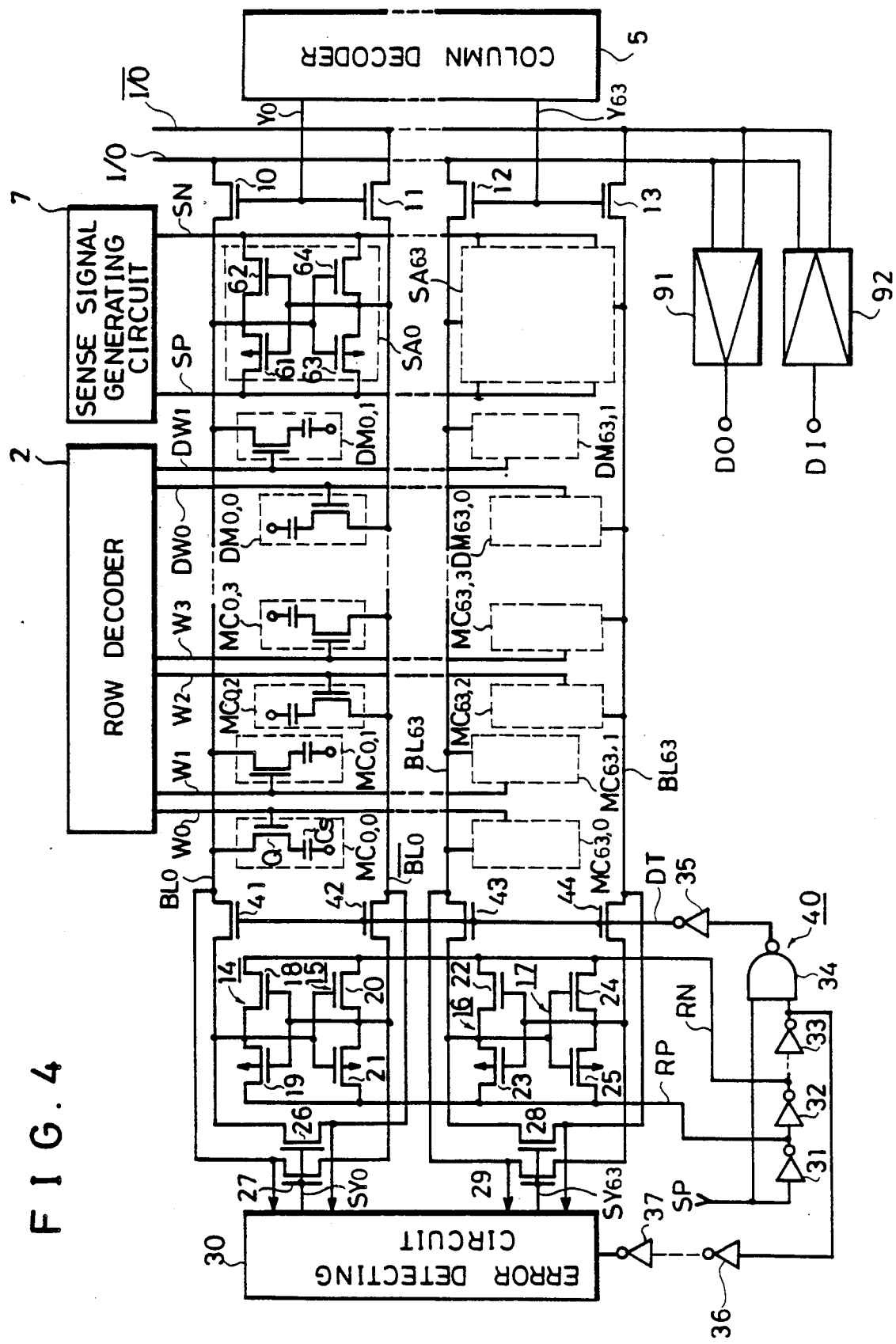
FIG. 4 is an electric circuit diagram in a main portion of one embodiment of the present invention.
Figure 5:
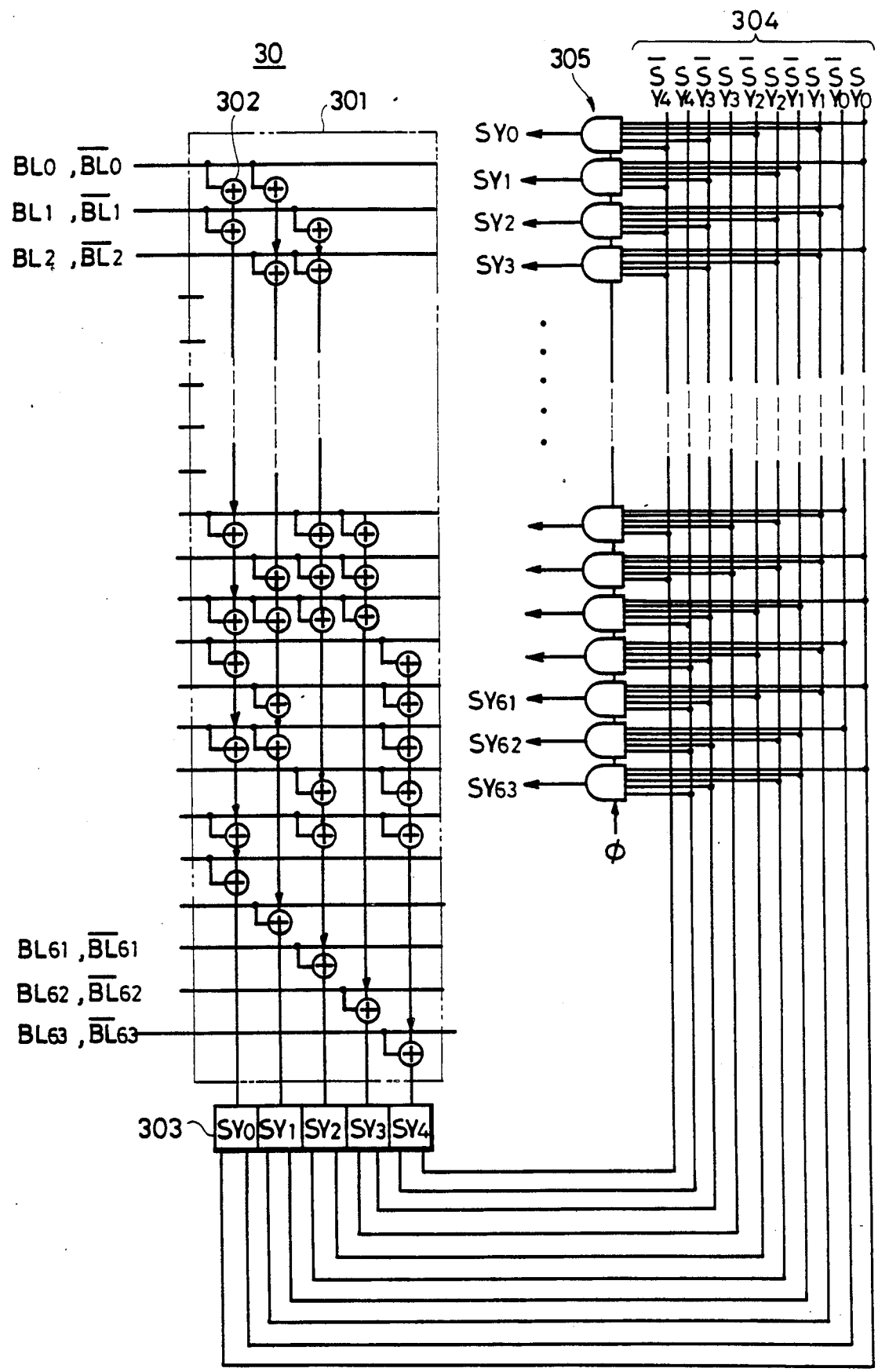
FIG. 5 is a concrete electric circuit diagram of the error detecting circuit shown in FIG. 4.

FIG. 4 is a more detailed electric circuit diagram of the above described one embodiment of the present invention, and FIG. 5 is an electric circuit diagram showing one example of the error detecting circuit shown in FIG. 4.

Figure 2:
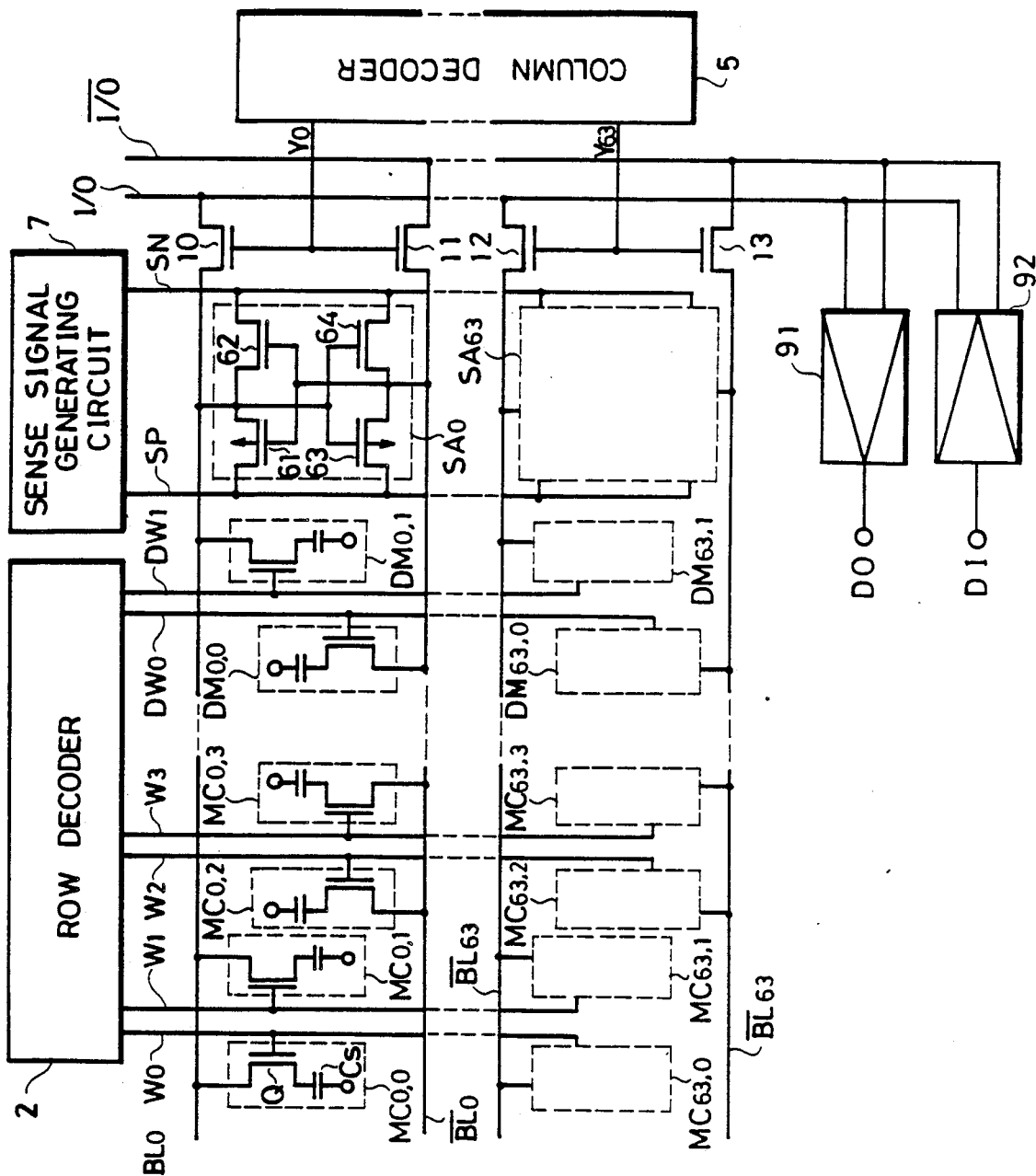
FIG. 2 is a concrete electric circuit diagram of the memory cell array shown in FIG. 1.

Referring to FIGS. 4 and 5, a description is made of the structure of the illustrated embodiment of the present invention. The semiconductor memory device having the error correcting circuit shown in FIG. 4 is structured in the same manner as that of the aforementioned FIG. 2, except for the following.

Bit line pairs $BL_0$ and $\overline{BL_0}$ to $BL_{63}$ and $\overline{BL_{63}}$ are connected to inputs of inverting amplifiers 14 to 17 through N channel MOS transistors 41 to 44. These N channel MOS transistors 41 to 44 are turned on at a high voltage level to connect the bit line pairs $BL_0$ and $\overline{BL_0}$ to $BL_{63}$ and $\overline{BL_{63}}$ to the inverting amplifiers 14 to 17 and cut off at a low voltage level. The inverting amplifier 14 comprises N channel MOS transistor 18 and P channel MOS transistor 19 and gates of the transistors 18 and 19 constitute the input of the inverted amplifier 14 which is connected to the source of the transistor 42. The transistors 18 and 19 have their drains connected together to the source of the transistor 41. A RN signal is applied to the source of the transistor 18 and a RP signal is applied to the source of the transistor 19. Similarly, the inverting amplifiers 15, 16 and 17 comprise transistors 20 to 25 and they are structured in the same manner as that of the inverting amplifier 14.

The N channel MOS transistors 26 and 28 control the conduction between the outputs of the inverting amplifiers 14 and 16 and the inverted bit lines $\overline{BL_0}$ and $\overline{BL_{63}}$, respectively, and the transistors 27 and 29 control conduction between the outputs of the inverting amplifiers 15 and 17 and the bit lines $BL_0$ and $BL_{63}$, respectively.

For this purpose, the drains of the transistors 26 and 28 are connected to the transistors 41 and 43, respectively, and the sources of the transistors 26 and 28 are connected to the inverted bit lines $\overline{BL_0}$ and $\overline{BL_{63}}$ and to an error detecting circuit 30. The sources of the transistors 27 and 29 are connected to the bit lines $BL_0$ and $BL_{63}$ and also to the error detecting circuit 30 and the drains of the transistors 27 and 29 are connected to the sources of the transistors 42 and 44.

A control circuit 40 is provided in order to control the conduction of the above mentioned transistors 41 to 44. The control circuit 40 comprises an odd number of inverters 31 to 33 connected in cascade, a NAND gate 34, an inverter 35, and an odd number of inverters 36 and 37 connected in cascade. An activation signal SP is applied from a sense signal generating circuit 7 to the control circuit 40 and a RP signal outputted from the output of the inverter 31 and a RN signal outputted from the output of the inverter 32 are applied to respective inverting amplifiers 14 to 17. A signal DT is outputted from the output at the inverter 35, which is applied to the gates of the transistors 41 to 44. A control signal is to be applied to the error detecting circuit 30 through the inverters 33, 36 and 37 and when the error detecting circuit 30 receives the control signal, it applies error detection signals $SY_0$ to $SY_{63}$ to the gates of the transistors 26 to 29.

Next, referring to FIG. 5, a description is made of a structure of the error detection circuit 30. The error detection circuit 30 comprises a syndrome generating circuit 301, a register 303, a syndrome decoder 304 and AND gates 305. The syndrome generating circuit 301 comprises combinations of a plurality of exclusive OR circuits 302 and information read from each memory cell through each bit line pair is applied to the syndrome generating circuit 301. In the syndrome generating circuit 301 shown in FIG. 5, the bit line pair is represented by one line for the sake of clarity of the drawing.

A signal $SY_i$ of an element of each row of syndrome generated by the syndrome generating circuit 301 is stored in the register 303. The signal $SY_i$ and a complementary signal $\overline{SY_i}$ are generated by the register 303 and these signals $SY_i$ and $\overline{SY_i}$ are applied to the syndrome decoder 304. The outputs of the syndrome decoder 304 are applied to the AND gates 305 and error detection signals $SY_0$ to $SY_{63}$ are outputted from the AND gates 305. Since the thus structured error detection circuit 30 is known to those skilled in the art, more detailed description is omitted.

Figure 6:
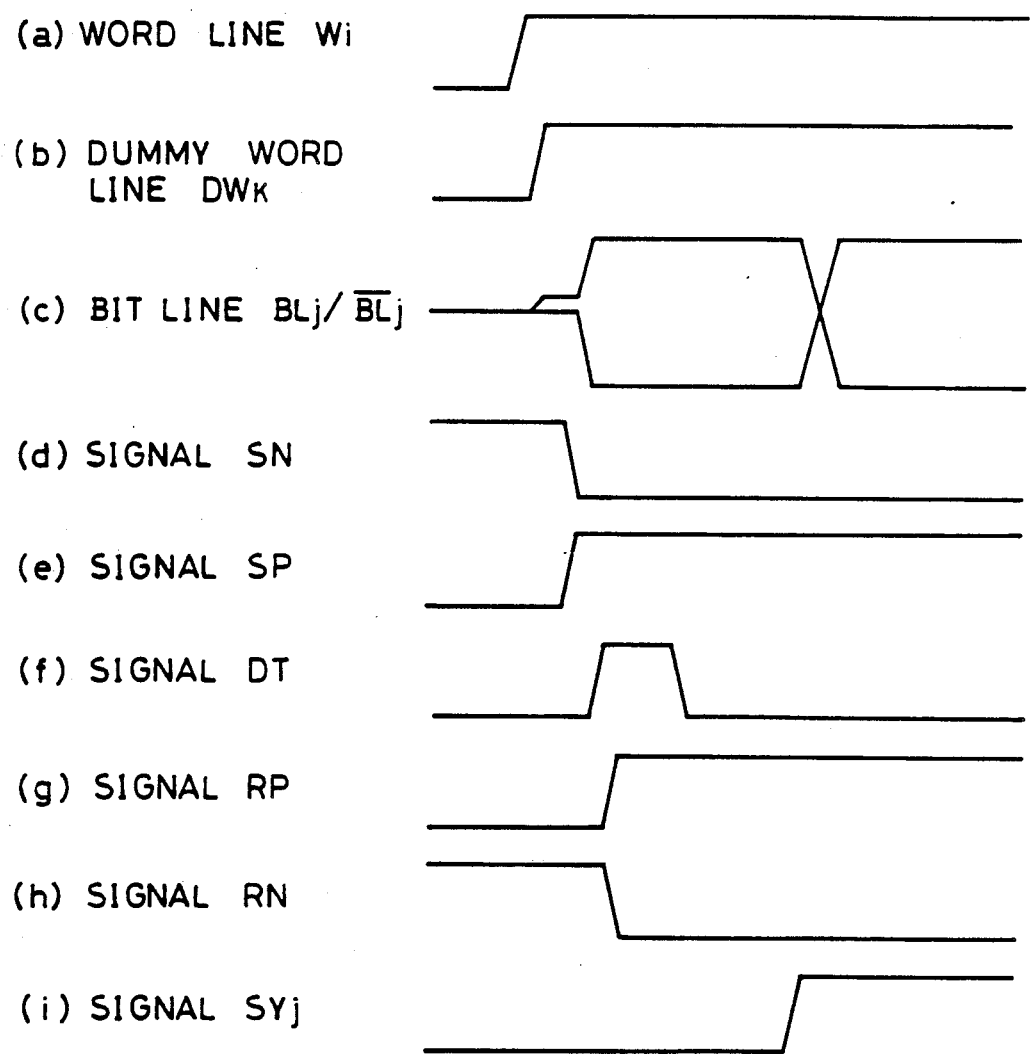
FIG. 6 is a timing diagram for describing the operation of one embodiment of the present invention.

FIG. 6 is a timing diagram shown for the illustrated embodiment of the present invention.

Referring to FIG. 4 to FIG. 6, a description is made of operation of the described embodiment of the present invention. The timing diagram shown in FIG. 6 represents a case in which when the i-th word line $WL_i$ is selected, an error is detected in the j-th bit line pair $BL_j$ and $\overline{BL_j}$. A potential of the word line $WL_i$ and a dummy word line $DW_k$ (k=0, 1) selected by the row decoder 1 is raised as shown in FIG. 6(a) and (b) in response to the row address signal applied from the outside of the chip and an electric charge representing information of a memory cell is read on each bit line pair and, as a result, a potential change is generated as shown in FIG. 6(c).

Then, the sense signal generating circuit 7 outputs a low level signal SN as shown in FIG. 6(d) and a high level signal SP as shown in FIG. 6(e). In response to these signals, the sense amplifier SA is activated and a voltage on the bit line pair is amplified.

On the other hand, the signal SP is delayed by the inverters 31 to 33 and inverting amplifiers 14 to 17 are activated by a signal RP shown in FIG. 6(g) which is outputted from the inverter 31 and by a signal RN shown in FIG. 6(h) which is outputted from the inverter 32. In addition, the signal SP and the delayed signal SP are applied to NAND gate 34 to be pulse-shaped and the pulse output is inverted by the inverter 35, with the result that a signal DT as shown in FIG. 6(f) is applied to the transistors 41 to 44. As a result, the transistors 41 to 44 are turned on and information of the bit line pairs $BL_0$ and $\overline{BL_0}$ to $\overline{BL_{63}}$ and $BL_{63}$ is transferred to the inverting amplifiers 14 to 17, with the result that a potential state is decided.

Then, a potential of the signal DT becomes a low level and the transistors 41 to 44 are turned off and, as a result, the bit line pairs $BL_0$ and $\overline{BL_0}$ to $BL_{63}$ and $\overline{BL_{63}}$ are electrically separated from the inverting amplifiers 14 to 17. Thereafter, the error detection circuit 30 inspects the data of each bit line pair and if an error is detected in the 0-th bit line pair $BL_0$ and $\overline{BL_0}$, for example, it generates a signal $SY_0$ and renders the transistors 26 and 27 conductive. When the transistors 26 and 27 are turned on, the output of the inverting amplifier 15 for inverting the information of the bit line $BL_0$ is outputted on the bit line $BL_0$ through the transistor 27 and the output of the inverting amplifier 14 for inverting the information of the inverted bit line $\overline{BL_0}$ is outputted on the inverted bit line $\overline{BL_0}$ through the transistor 26. As a result, the respective information of the bit line pair $BL_0$ and $\overline{BL_0}$ is inverted.

Figure 7:
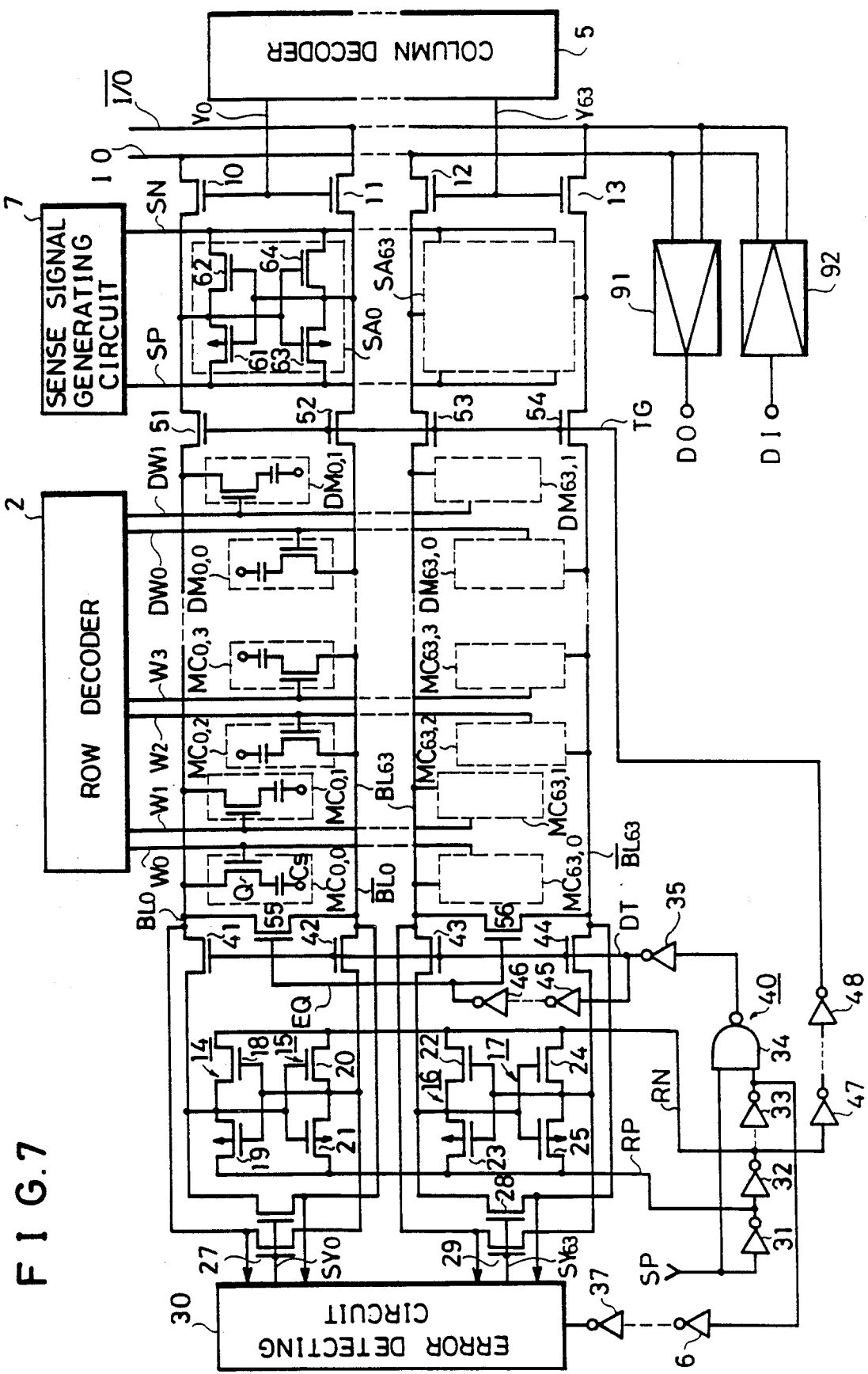
FIG. 7 is an electrical circuit diagram in a main portion of another embodiment of the present invention.

FIG. 7 is a detailed block diagram showing another embodiment of the present invention.

Figure 8:
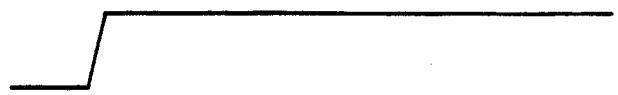
FIG. 8 is a timing diagram for describing the operation of the embodiment shown in FIG. 7.
Figure 8:
Figure 8:
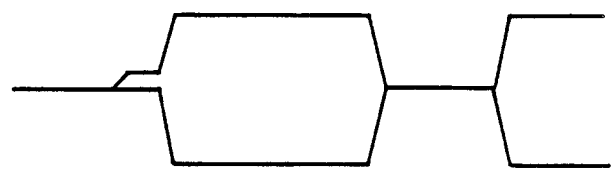
Figure 8:
Figure 8:
Figure 8:
Figure 8:
Figure 8:
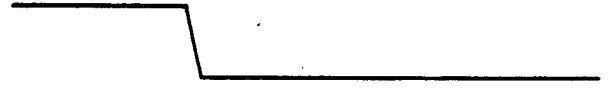
Figure 8:
Figure 8:
Figure 8:

In the embodiment shown in FIG. 7, bit line pairs $BL_0$ and $\overline{BL_0}$ to $\overline{BL_{63}}$ and $BL_{63}$ are separated from sense amplifiers $SA_0$ to $SA_{63}$ prior to the inversion of a potential of the bit line pair on which an error has been detected, and respective bit line pairs $BL_0$ and $\overline{BL_0}$ to $BL_{63}$ and $\overline{BL_{63}}$ are short-circuited so as to be made equal in potential, with the result that potentials of the bit line pairs $BL_0$ and $\overline{BL_0}$ to $BL_{63}$ and $\overline{BL_{63}}$ are inverted at high speed. For this purpose, N channel MOS transistors 51 to 54 are inserted between the sense amplifiers $SA_0$ to $SA_{63}$, and the bit line pairs $BL_0$ and $\overline{BL_0}$ to $BL_{63}$ and $\overline{BL_{63}}$ to which each of memory cells $MC_{0, 0}$ to $MC_{63, 63}$ and dummy cells $DM_{0, 0}$ to $DM_{63, 1}$ are connected and a signal TG is applied to the gates of the transistors 51 to 54. Although the signal TG is usually at a high level and the transistors 51 to 54 are on, the signal TG becomes a low level to separate the sense amplifiers $SA_0$ to $SA_{63}$ from each of memory cells $MC_{0, 0}$ to $MC_{63, 63}$ and dummy cells $DM_{0, 0}$ to $DM_{63, 1}$, when an error in the information of the bit line pairs $BL_0$ and $\overline{BL_0}$ to $BL_{63}$ and $\overline{BL_{63}}$ is detected. The signal RN is delayed by inverters 45 and 46, whereby the signal TG is created as shown in FIG. 8(j).

In addition, N channel MOS transistors 55 and 56 are connected in order to short-circuit between each of bit line pairs $BL_0$ and $\overline{BL_0}$ and $BL_{63}$ and $\overline{BL_{63}}$ respectively. A signal EQ is applied to each gate of the transistors 55 and 56. Although the signal DT is delayed by inverters 47 and 48, whereby the signal EQ is created as shown in FIG. 8(k) and it is usually at a low level, the signal becomes low level to turn the transistors 55 and 56 on and to short-circuit between each of bit line pairs $BL_0$ and $\overline{BL_0}$ and $BL_{63}$ and $\overline{BL_{63}}$, respectively, when an error of information is detected.

Therefore, when an error of information is detected, the sense amplifiers $SA_0$ to $SA_{63}$ are separated from each of memory cells $MC_{0, 0}$ to $MC_{63, 63}$ and dummy cells $DM_{0, 0}$ to $DM_{63, 1}$ to short-circuit each of bit line pairs $BL_0$ and $\overline{BL_0}$ to $BL_{63}$ and $\overline{BL_{63}}$ and, as a result, a potential of each of bit line pairs $BL_0$ and $\overline{BL_0}$ to $BL_{63}$ and $\overline{BL_{63}}$ can be inverted in high speed.

More specifically, in the above mentioned embodiment shown in FIG. 4, when a potential of the bit lines $BL_0$ and $\overline{BL_0}$ are inverted by the outputs of the inversion amplifiers 14 and 15, it took a relatively long time until the potentials of the bit line $BL_0$ and the inverted bit line $\overline{BL_0}$ were inverted because the potential before inversion and the potential after inversion are overlapped as shown in FIG. 6(c).

Meanwhile, in this embodiment, when the signal TG becomes a low level, the transistors 51 and 52 become non-conductive as shown in FIG. 8(j) and the sense amplifier $SA_0$ to $SA_{63}$ are separated from each of memory cells $MC_{0, 0}$ to $MC_{63, 63}$ and dummy cells $DM_{0, 0}$ to $DM_{63, 1}$. Thereafter, as shown in FIG. 8(k), when the signal EQ becomes high level a few milliseconds later, the transistors 55 and 56 become conductive to short circuit between the bit line pairs $BL_0$, $\overline{BL_0}$ to $BL_{63}$, $\overline{BL_{63}}$. Therefore, the potential of each of bit line pairs $BL_0$, $\overline{BL_0}$ to $BL_{63}$, $\overline{BL_{63}}$ becomes 0 steeply and, thereafter, when the potential of a signal $SY_j$ shown in FIG. 8(i) becomes high, the potentials of the bit line pairs $BL_0$, $\overline{BL_0}$ to $BL_{63}$, $\overline{BL_{63}}$ are inverted. Consequently, the potentials of the bit line pairs $BL_0$, $BL_0$ to $BL_{63}$, $BL_{63}$ can be inverted at high speed as compared with the embodiment shown in FIG. 4.

Although the signals RP and RN are shown as being applied to each source of the transistors 18 to 25 contained in the inverting amplifiers 14 to 17, it is to be understood that the present invention is not limited to this and fixed potentials such as a power supply potential and the ground potential may be applied.

Therefore, according to the present invention, since each bit line pair is separated from the corresponding information inverting means in response to error detection of the information of any bit line pair, and the inverted information by the information inverting means is outputted on the corresponding bit line pair, whereby the information of the bit line pair is forcedly rewritten, an error correcting circuit can be contained in a semiconductor memory without any increase in the number of I/O bus line pairs and, therefore, an error can be detected and corrected at high speed while an increase in chip area can be controlled as much as possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device having an error correcting circuit, comprising:
   a memory cell array having a plurality of memory cells arranged in a matrix comprising rows and columns of each storing information;
   a plurality of word lines connected said memory cells arranged in a row direction;
   a plurality of bit line pairs connecting said memory cells arranged in a column direction, each of said bit line pairs constituting a return bit line;

error detecting means connected to a plurality of bit line pairs for detecting an error of information of each bit line pair;

information inverting means provided corresponding to respective bit line pairs for inverting information of the corresponding bit line pair;

first switching means for connecting each said bit line pair to each said information inverting means;

second switching means for outputting information inverted by each said information inverting means to the corresponding bit line pair; and control means for controlling the first switching means corresponding to the bit line pair in response to detection of an error of information of any bit line pair by error detecting means, controlling the corresponding second switching means while cutting the corresponding bit line pair from the information inverting means, and outputting the inverted information on the corresponding bit line pair whereby the detected error of information is corrected.

2. A semiconductor memory device having an error correcting circuit in accordance with claim 1, wherein said plurality of bit line pairs each comprise a bit line and an inverted bit line and wherein said first switching means comprises:

a first switching transistor for connecting said bit line to said information inverting means; and second switching transistor for connecting said inverted bit line to said information inverting means.

3. A semiconductor memory device having an error correcting circuit in accordance with claim 2, wherein said information inverting means comprises:

first inverting amplifying means having its input connected to said bit line through said first switching transistor and its output connected to said bit line through said second switching means for holding and inverting the inputted information; and second inverting amplifying means having its input connected to said inverted bit line through said second switching transistor and its output connected to said inverted bit line through said second switching means for holding and inverting the inputted information.

4. A semiconductor memory device having an error correcting circuit in accordance with claim 3, wherein said second switching means comprises:

a third switching transistor connected between the input of said first inverting amplifying means, the output of said second inverting amplifying means and said inverted bit line for applying the output of said second inverting amplifying means to said inverted bit line in response to error detection of information by said error correcting and detecting means; and a fourth switching transistor connected between the output of said first inverting amplifying means, the input of said second inverting amplifying means and said bit line for applying the output of said first inverting amplitude means to said bit line in response to error detection of information by said error correcting and detecting means.

5. A semiconductor memory device having an error correcting circuit in accordance with claim 2 further comprising:

a sense amplifier to which information of said bit line and said inverted bit line are applied;

a fifth switching transistor for connecting said bit line to said sense amplifier;

a sixth switching transistor for connecting said inverted bit line to said sense amplifier;

a seventh switching transistor for short-circuiting said bit line and said inverted bit line;

means for turning said fifth and sixth switching transistors off in response to error detection of said information by said error correcting and detecting means, turning said seventh switching transistor on after separating said bit line and said inverted bit line from said sense amplifier, and short-circuiting said bit line and said inverted bit line to make respective bit lines equal in potential.

6. A semiconductor memory device having an error correction circuit in accordance with claim 2, further comprising:

a row decoder connected to each said word line for selecting any word line;

an input/output line for outputting information of each said bit line and each said inverted bit line to the outside and applying information from the outside to said each bit line and said each inverted bit line;

a eighth switching transistor for connecting said input/output line to said bit line and said inverted bit line; and a column decoder for selecting any one of said eighth switching transistor and connecting the corresponding bit line and inverted bit line to said input/output line.

7. In a semiconductor memory device comprising a memory cell array arranged in a matrix including rows and columns and word lines and bit line pairs, a method for correcting an error in information read from said memory cell array comprising the steps of:

reading information stored in said memory cell array onto said bit line pairs in response to a signal applied to said word lines;

simultaneously inverting the information read on said bit line pairs and detecting an error in the information read on said bit line pairs; and selectively applying said inverted information onto said bit line pairs in response to said detection of an error in the information thus correcting an error in the information.

8. In a semiconductor memory device comprising a memory cell array arranged in a matrix including rows and columns, sense amplifiers, word lines and bit line pairs, a method for correcting an error in information read from said memory cell array comprising the steps of:

reading the information stored in said memory cell array onto said bit line pairs in response to a signal applied to said word lines;

simultaneously inverting the information read onto said bit line pairs and detecting an error in the information read onto said bit line pairs;

disconnecting said sense amplifiers from said bit line pairs;

equalizing said bit line pairs by short circuiting response bit lines of said bit line pairs to each other; and outputting said inverted information onto said bit line pairs correcting an error in the information in response to said detection of an error in the information and after said bit line pairs are disconnected from said sense amplifiers and said bit line pairs are equalized.

* * * * *